United States Patent [19]

Rapayelian

[11] Patent Number: 5,149,236
[45] Date of Patent: Sep. 22, 1992

[54] DEVICE FOR ASSEMBLING FRAMES AND FRAME MOULDINGS AND A MITER CUTTING MACHINE FOR IMPLEMENTING THE DEVICE

[75] Inventor: Christian Rapayelian, Marseille, France

[73] Assignee: Cassese Society, France

[21] Appl. No.: 596,837

[22] Filed: Oct. 9, 1990

[51] Int. Cl.⁵ ............................................. F16B 15/00
[52] U.S. Cl. ..................................... 411/439; 411/457; 411/912; 403/294; 403/401
[58] Field of Search ....................... 411/457, 439, 912; 403/294, 401

[56] References Cited

U.S. PATENT DOCUMENTS

| | | | |
|---|---|---|---|
| 111,128 | 1/1871 | Linscott | 403/401 X |
| 497,915 | 5/1893 | Fulghum et al. | 403/294 |
| 1,350,155 | 8/1920 | Hellweg | 403/294 X |
| 3,425,721 | 2/1969 | Agee | 403/401 X |
| 4,262,973 | 4/1981 | Grilli et al. | 403/294 X |
| 4,913,579 | 4/1990 | Campana | 403/401 X |

FOREIGN PATENT DOCUMENTS

| | | | |
|---|---|---|---|
| 816011 | 1/1952 | Fed. Rep. of Germany | 403/401 |
| 2425010 | 1/1980 | France | 403/294 |
| 584321 | 1/1977 | Switzerland | 403/294 |

*Primary Examiner*—Rodney M. Lindsey
*Attorney, Agent, or Firm*—Hodgson, Russ, Andrews, Woods & Goodyear

[57] ABSTRACT

A device is disclosed for assembling frames and moulding frames, comprising a monolithic assembly piece (31) forming a double tenon and having the form of two identical circular truncated cones of a height substantially equal to the thickness of the workpieces (32, 33) to be assembled. Said assembly piece is fitted into blind bores (34, 35) of corresponding shape having on the edge junction surfaces of the workpieces to be assembled. It is intended to assembling, with or without bonding, joinery pieces of wood or other materials, such as mitered moulding frames. The mitering machine for implementing the assembly device (31) comprises a sealed casing (1) equipped with two circular saw blades (4, 5) perpendicular to each other and driven with a single electric motor. The casing is mobile vertically with respect to a working surface (3) equipped with fixing means (15, 16) for the workpiece to be cut. Two conical milling tools (28) situated under the working surface provide simultaneously the bores (34, 35) of the workpieces to be assembled.

2 Claims, 2 Drawing Sheets

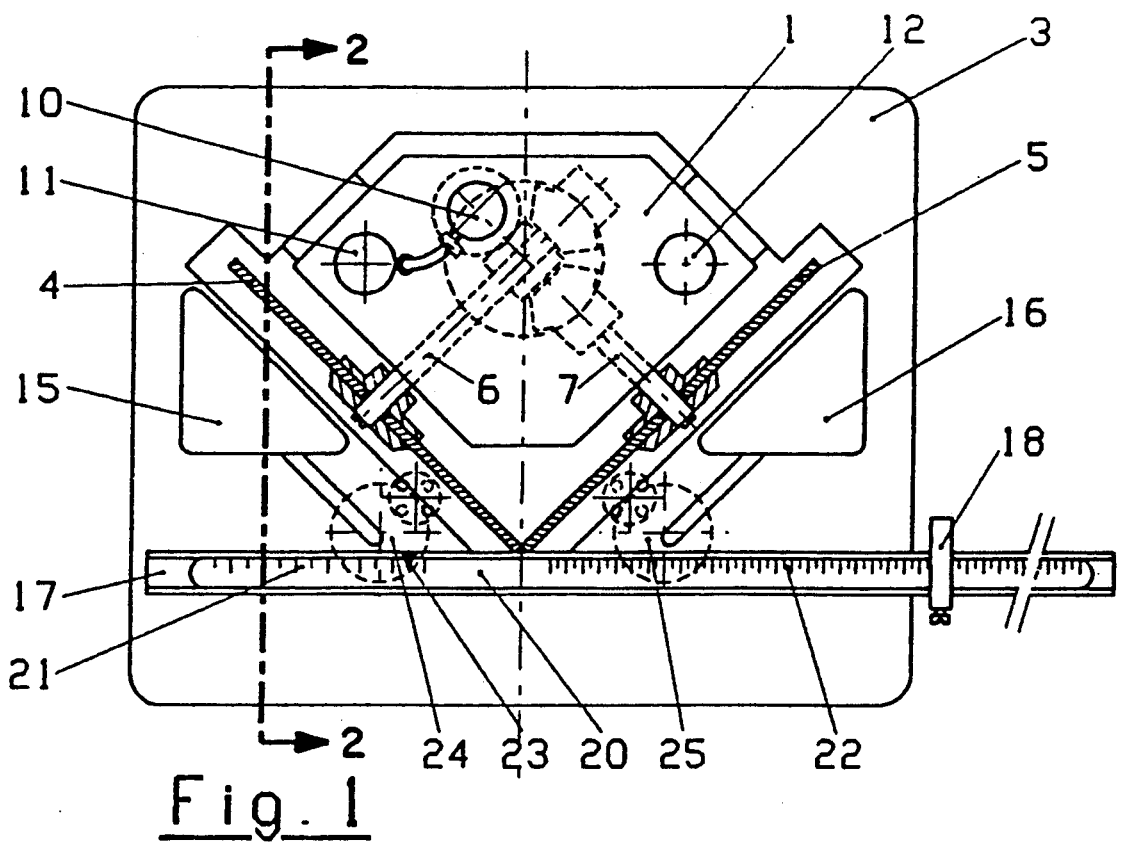
Fig. 1
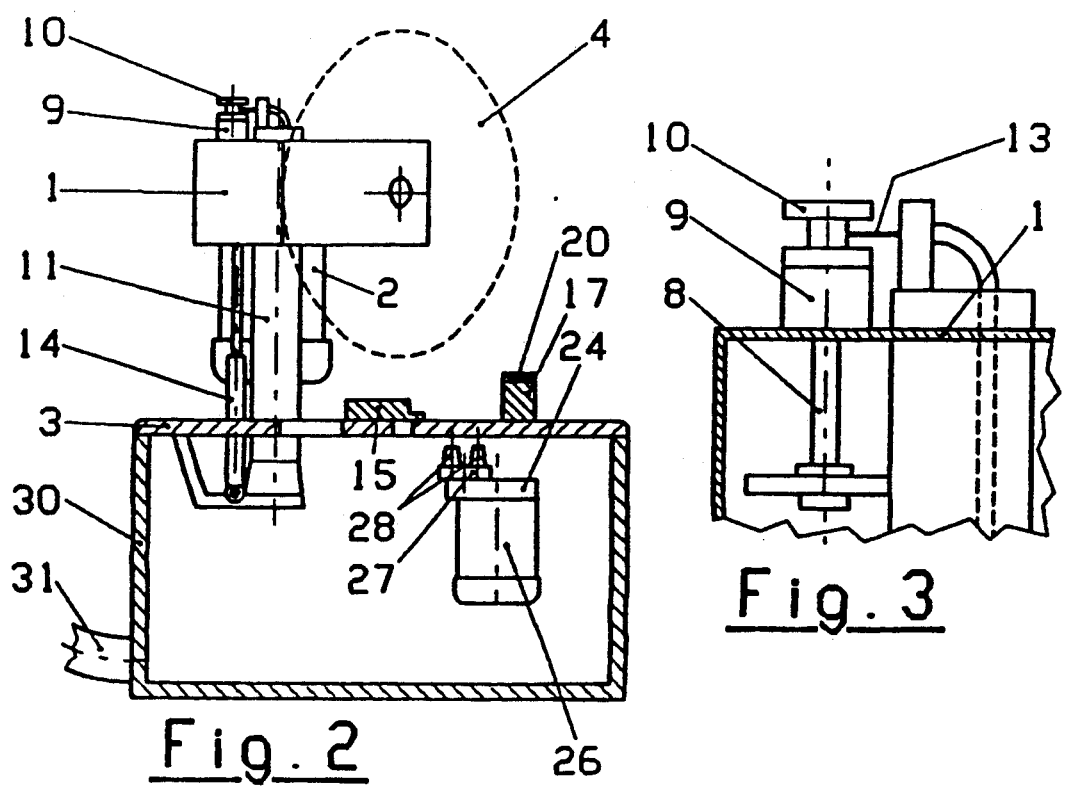
Fig. 2
Fig. 3

DEVICE FOR ASSEMBLING FRAMES AND FRAME MOULDINGS AND A MITER CUTTING MACHINE FOR IMPLEMENTING THE DEVICE

The present invention relates to a device and machine for assembling frames and mouldings.

It is intended for mitring pieces of wood or other materials, such as frame mouldings, in joinery and cabinet-making and assembling them without bonding.

BACKGROUND OF THE INVENTION

The devices produced up to present are generally equipped with a single saw blade, which involves a double operation for cutting a moulding, as well as modification of the adjustment of the cutting angle between operations. These operations require considerable labour time and do not guarantee strictly perpendicular cutting angles. These exist machines comprise two saw blades disposed at each end of the moulding to be cut, but the blades are each driven by a motor, which makes these machines expensive and the distance between the blades must be adjusted for each moulding length, which dictates large scale production. The assembly of the cut pieces requires the use of systems for positioning them accurately with respect to each other, such as double or multiple clamping presses, or apparatus with mobile vices, for example.

The parts to be assembled together are then joined together by bonding, nailing, clipping or combinations of such means, which in no case permit subsequent dismantling.

SUMMARY OF THE INVENTION

The apparatus according to the present invention proposes overcoming such drawbacks. In fact, it makes it possible in a single operation to cut two strictly perpendicular mitres, adjustment of the length of the mouldings being made very easily by simply moving a mobile stop. Furthermore, since the two saw blades with which the machine is equipped are driven by a single motor, the cost price of the device is relatively low. The system allows the cut workpieces to be positioned accurately and removably assembled in a single operation. In addition, for definitive assembly by bonding, the device applies the bonded surfaces firmly together without any clamping apparatus. The apparatus is formed by the combination first of all of a sealed casing, sliding vertically, which may be filled with lubricant, having three output shafts perpendicular to each other and driven by a single motor, two horizontal shafts each receiving a circular saw blade rotating in the same direction and a vertical shaft driving, via an electric clutch, a pulley on which a cable is wound attached to the working surface, then a working surface equipped with a double press holding the moulding to be cut at the bottom of a groove and an adjustable stop device for accommodating the width of the moulding, and finally at least two milling machines driven by an electric motor, situated under the working surface and equipped with a milling head having one or more conical milling tools.

The assembly device is formed of a monolithic piece in the form of two identical circular truncated cones of a height substantially equal to three quarters of the thickness of the workpieces to be assembled together and juxtaposed so that the distance between their parallel axes is slightly less than the length of the largest diameter and so that the large and small bases, perpendicular to the axes, are respectively in the same plane, the two largest forming an eight and the two smallest being tangent or very nearly so, so that the intersection of the two truncated cones forms a triangle, said monolithic piece being intended to be force fitted into two blind bores each having the form of one of said truncated cones and formed at the end of each of the two workpieces to be assembled by the above mentioned apparatus, so that, once these parts have been joined, the monolithic piece firmly applies the surfaces to be joined one against the other.

BRIEF DESCRIPTION OF THE DRAWINGS

In the accompanying drawings, given by way of non limitative example, one of the embodiments of the object of the invention is shown.

FIG. 1 shows schematically the mitring machine seen in a top view, without protective cover, FIG. 2 is an elevational section, on a different scale, taken in the direction of arrows 2—2 of FIG. 1, FIG. 3 shows an enlarged detail of the pulley winding up the cable which lowers the blades.

DESCRIPTION OF THE PREFERRED EMBODIMENTS

Figure 4:
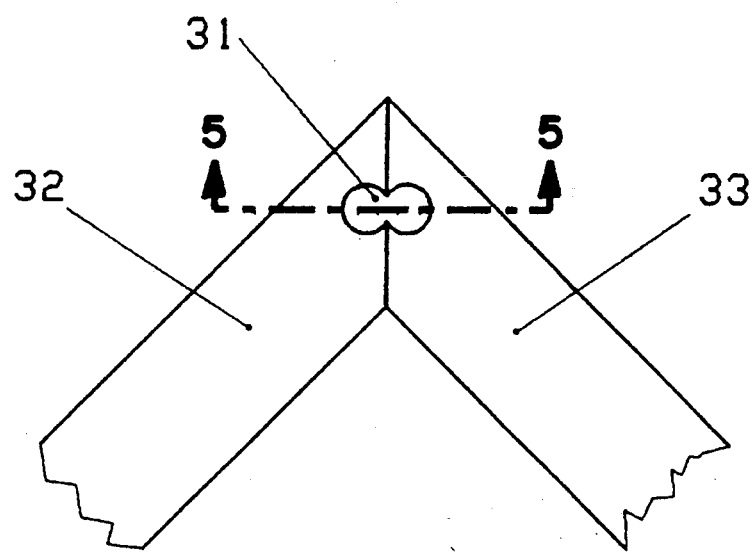
FIG. 4 shows the assembly device seen from the front.

The apparatus, shown in FIGS. 1 to 3, is formed schematically of three elements: a multi-blade electric saw having a protective cover (not shown), a working surface and two milling machines. The electric saw is formed of a bevel gear 1 with three outputs coupled to an electric motor 2. Two shafts 6, 7 oriented at 90°, parallel to the working surface 3, each receiving a circular saw blade 4, 5. A vertical shaft 8 receives an electric clutch 9 coupled to a pulley 10.

The assembly thus formed slides vertically on two columns 11, 12 fixed to the working surface 3 and is held in the top position by two pneumatic springs 14. It moves along the columns by means of a cable 13 winding over pulley 10 which is controlled by the electric clutch 9. Rising to the top position is caused by the pneumatic springs 14 with the power supply to clutch 9 switched off. This arrangement provides positive safety since the blades are automatically moved away from the working surface in the case of a current failure. During the reciprocal movement of casing 1, the two blades 4, 5 make simultaneously 45° cuts at both ends of the moulding. The working surface 3 supports the columns 11, 12 guiding the saw and is mounted above an enclosure 30 receiving the waste and sawdust and possibly equipped with a suction means 31. It is equipped with two presses 15, 16 holding the moulding to be cut by bearing on the groove bottom, as well as a fixed support 17 having an adjustable stop 18 and a movable strip 20 carrying a double graduation 21, 22. One of the graduations 22 is used for positioning the stop 18 as a function of the length to be obtained. The second graduation 21, with intervals twice those of graduation 22 and situated opposite a pointer 23 fast with the fixed support 17, makes it possible to move strip 20 so that the cutting length is measured at the bottom of the moulding groove, whatever the width thereof.

The milling machines 24, 25 situated under the working surface 3 are driven by an electric motor 26 and are positioned automatically during movement of the moulding holding presses, in the centre of the distance separating the latter from the fixed support 17, by means of a screw having two different pitches and driving simultaneously press and milling machine. Each milling machine is equipped with a milling head 27 which may comprise milling tools 28 of several dimensions.

In a variant, the pulley 17 and cable 13 assembly may be replaced by a toothed wheel with clutch and a rack fast with one of columns 11, 12.

Figure 5:
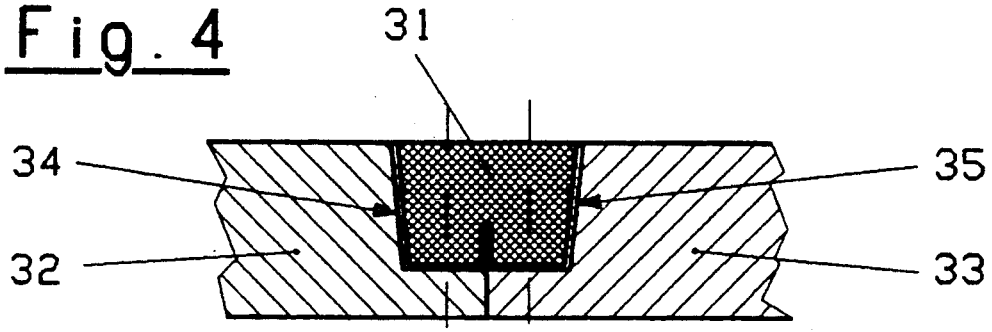
FIG. 5 is a section, on a different scale, in the direction of arrows 5—5 of FIG. 4.
Figure 6:
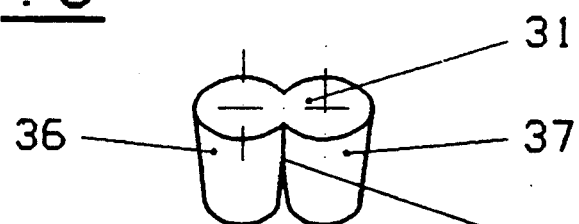
FIG. 6 shows the assembly piece in perspective.
Figure 7:
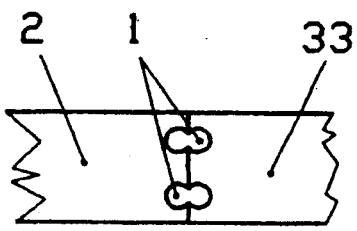
FIGS. 7, 8 and 9 illustrate several examples of using the device.
Figure 8:
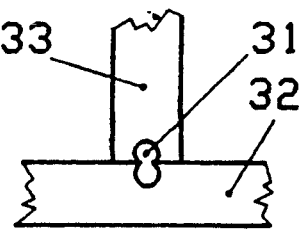
Figure 9:
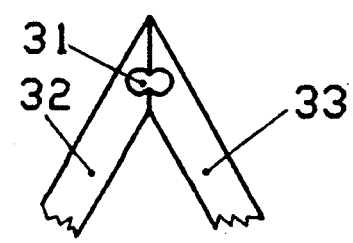

The device shown in FIGS. 4 to 9 is formed of an assembly piece 31 force fitted into two blind bores 34, 35 of corresponding shape formed by the above apparatus in each of the workpieces to be assembled 32, 33, at the edge of the junction surfaces. The assembly piece 31 is preferably made from a semi-resilient thermoplastic material, but may also be made from hard wood or even metal. It has the form of two truncated cones 36, 37 with parallel axes and coplanar bases perpendicular to the axes, assembled side by side so that the assembly piece 31 forms a double tenon with a triangular intersection 38 whose largest width is substantially equal to half the diameter of the largest base.

Bores 34 and 35 intended to receive the assembly piece 31 are formed on a face, not visible, before cutting of the workpieces 32 and 33 to be assembled, so as to be able to position them with the maximum accuracy just at the edge end of the cutting surface. It is in fact necessary for the edge of these bores to define on each junction surface an indentation of a shape identical to that of the intersection 8 of the assembly piece 31. Furthermore, the position of the bores is determined so that positioning of the assembly piece 31 firmly applies the junction surfaces one against the other, either to form a sufficiently strong demountable assembly or to play the role of clamping piece in the case of bonding.

Because of its facility of use, absence of adjustment and low cost price, the apparatus which has just been described lends itself particularly well to equipping do-it-yourself sales points. It makes it possible to rapidly cut all mouldings existing on the market, which will thus be made available to the amateur ready to be assembled so as to form decorative frames very easily.

The positioning of the different component elements give this device a maximum of useful effects which had not been obtained up to now by similar devices.

I claim:

1. Device for assembling frames and frame mouldings comprising a monolithic assembly piece forming a double tenon and intended to be introduced into blind bores of corresponding shape provided at the edge of the junction surfaces of a workpiece to be assembled, characterized by the fact the double tenon has the form of two identical circular truncated cones (36, 37) of a height substantially equal to three quarters of the thickness of workpieces (32, 33) to be assembled and by the fact that the two circular truncated cones are juxtaposed so that the distance between their parallel axes is slightly less than the length of the largest diameter, and so that the large and small bases, perpendicular to the axes, are respectively in the same plane, the two largest forming an eight and the two smallest being tangent or very nearly so, so that the intersection (38) of the two truncated cones (36, 37) forms a triangle, and by the fact that the two blind bores (34, 35) each have the form of one of said truncated cones and are formed at the end of each of the two workpieces (32, 33) to be assembled, so as to define on each junction surface an indentation of a form identical to that of the intersection (38) of the assembly piece (31) so that, once said workpieces (32, 33) have been joined, the assembly piece (31) may be force fitted into these two bores (34, 35) and firmly apply the surfaces to be joined one against the other so as to form a strong assembly which may be dismantled.

2. Assembly device according to claim 1, characterized by the fact that the assembly piece (31) plays the role of clamping press when the workpieces to be assembled (32, 33) are bonded in the aim of obtaining a permanent assembly.

* * * * *